UNITED STATES PATENT OFFICE.

HEINRICH POLIKIER, OF LEIPZIG, GERMANY, ASSIGNOR TO ACTIEN GESELLSCHAFT FÜR ANILIN FABRIKATION, OF BERLIN, GERMANY.

MONOAZO DYE FOR WOOL.

1,003,293.  Specification of Letters Patent.  Patented Sept. 12, 1911.

No Drawing.  Application filed June 26, 1911. Serial No. 635,331.

*To all whom it may concern:*

Be it known that I, HEINRICH POLIKIER, a subject of the Czar of Russia, residing at Leipzig, Germany, my post-office address being Lortzingstrasse 14, Leipzig, Germany, have invented certain new and useful Improvements in Monoazo Dye for Wool, of which the following is a specification.

My invention relates to the manufacture of new yellow monoazo dyes for wool fast to washing, which may be obtained by combining diazo compounds of the benzene series, substituted by chlorin in the ortho position to the nitrogen with alkylaralkylanilin-monosulfonic acids.

The following example, the parts being by weight, illustrates the invention, without, however, limiting it.

Example: 16.1 parts of 2.5-dichloroanilin are diazotized by means of 50 parts of hydrochloric acid of 12° Baumé and 7 parts of sodium nitrite and the diazo compound is combined with 29.1 parts of ethylbenzylanilin sulfonic acid in solution alkaline with sodium carbonate. The separated dye is filtered off and dried. It produces on wool from an acid bath yellow tints of good fastness to washing. In the dry and pulverized shape it is an orange powder, easily soluble in water to a yellow solution, which is not altered by an alkali, but which is changed to red from a mineral acid. In concentrated sulfuric acid the dye dissolves to a yellow solution, on addition of ice assuming a red coloration and then separating the free acid of the dye. By reduction it yields 2.5-dichloroanilin and 4-aminoethylbenzylanilin sulfonic acid.

Having now described the invention and in what manner it may be performed what I claim is,—

1. As new articles of manufacture the herein-described new monoazo dyes derived from diazo compounds of the benzene series, substituted by chlorin in the ortho position to the nitrogen and alkylaralkylanilin sulfonic acids, which dye wool from an acid bath, generally speaking, yellow shades, which dyes are in the dry and pulverized shape of their sodium salts orange powders, easily soluble in water to a yellow solution, which is not altered by an alkali but which is changed to red from a mineral acid, which dyes are soluble in concentrated sulfuric acid with a yellow coloration, turning to red on the addition of ice, whereupon the free acids of the dyes are separated and which dyes by reduction yield ortho-chlorinated amins of the benzene series and 4-aminoalkylaralkylanilin sulfonic acids.

2. As a new article of manufacture the herein-described new monoazo dye derived from the diazotized 2.5-dichloroanilin and ethylbenzylanilin sulfonic acid, which dyes wool from an acid bath yellow shades, which dye is in the dry and pulverized shape of its sodium salt an orange powder, easily soluble in water to a yellow solution, which is not altered by an alkali, but which is changed to red from a mineral acid, which dye is soluble in concentrated sulfuric acid with a yellow coloration, turning to red on the addition of ice, whereupon the free acid of the dye is separated, and which dye by reduction yields 2.5-dichloroanilin and 4-aminoethylbenzylanilin sulfonic acid.

In testimony whereof I have hereunto set my hand in presence of two subscribing witnesses.

HEINRICH POLIKIER.

Witnesses:
 ALBERT R. MORAWITZ,
 RUDOLPH FRICKE.